Feb. 7, 1933.  F. SCHARFF  1,896,830
DEVICE FOR INFLUENCING BY MEANS OF A RAY
PROJECTOR A CELL SENSITIVE TO LIGHT
Filed Sept. 11, 1930
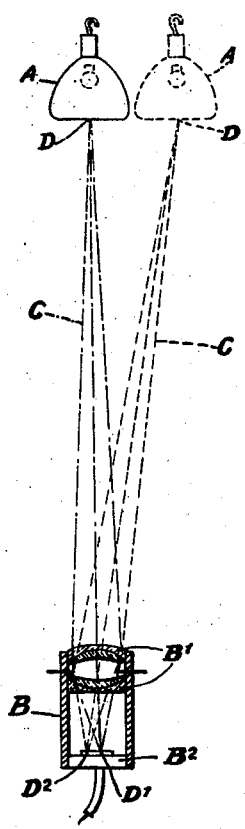
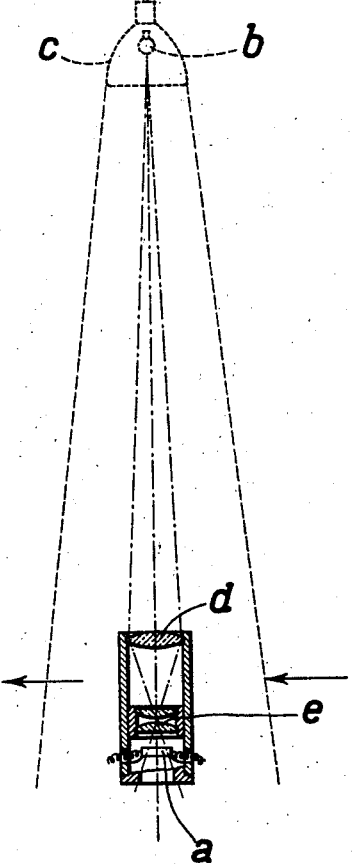
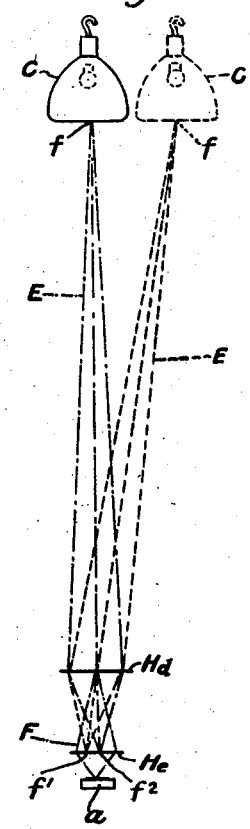
Inventor:

Patented Feb. 7, 1933

1,896,830

UNITED STATES PATENT OFFICE

FRANZ SCHARFF, OF JENA, GERMANY, ASSIGNOR TO THE FIRM CARL ZEISS, OF JENA, GERMANY

DEVICE FOR INFLUENCING BY MEANS OF A RAY PROJECTOR A CELL SENSITIVE TO LIGHT

Application filed September 11, 1930, Serial No. 481,124, and in Germany September 20, 1929.

When a cell sensitive to light, e. g., a selenium cell, should be influenced by a ray transmitter, e. g., by a searchlight or a reflector illuminated by a lamp, the ray transmitter is usually imaged on the cell by means of an optical system in such a manner as to render effective on the cell the greatest possible quantity of light. Devices of this kind are used also when the cell should be influenced when passing through the influencing ray pencil in a crosswise direction, whereby the system imaging the ray transmitter naturally must be fixedly connected with the movable cell. However, in this case arises the disadvantage that the image of the ray transmitter alters its position on the moving cell and consequently the selenium is covered by light only partly or that the ray transmitter must necessarily project a great image onto the cell, which means that always a great quantity of light passes the cell without being effective.

According to the invention the said disadvantage is overcome by connecting with the cell an optical system of two parts whereof the part next to the ray transmitter serves the purpose of imaging the ray transmitter on the place of the other part, whereas this other part serves for projecting an image of the first said part approximately on the light-sensitive cell. Then the image of the ray projector passes on to the said other imaging part, which, however, will no longer prove a disadvantage when care is taken that this part is large enough. The image projected on the light sensitive cell, however, remains motionless in spite of the movement and the whole of the cell always can be lit up.

In the accompanying drawing, Figure 1 shows schematically, in front elevation, a device of the known construction, Figure 2 in a sectional side elevation a constructional example of a receiver according to the invention, and Figure 3 the paths of the rays in a device according to Figure 2.

Referring to Figure 1, A represents a light projector and B a light receiver, the latter consisting of a lens system $B^1$ and a selenium cell $B^2$. The lens system $B^1$ and the cell $B^2$ are fixedly connected to each other. The lens system $B^1$ is similar to a photographic objective and images the aperture of the light projector A on the selenium cell. When the projector A takes the position indicated in Figure 1 by full lines, a point D of the projector aperture is imaged at the point $D^1$ of the cell $B^2$. If the projector is then moved into the position indicated by dash lines, the point D is imaged at the point $D^2$ on the cell. The image of the aperture of the projector A thus is made to travel over the cell $B^2$ when this projector is moved.

In the device according to the invention (Figure 2), in which a selenium cell $a$ is to be influenced by a ray transmitter $c$ containing an incandescent bulb $b$, the ray transmitter is imaged by an optical system which consists of two parts, $d$, $e$, and is so constructed and arranged that its front part $d$ projects an image of the aperture of the transmitter $c$ approximately at the place of the hindermost part $e$ consisting of two converging lenses, and that its hindermost part $e$ images the aperture of the front part $d$ on the selenium cell. This image is now explained with reference to Figure 3 of the accompanying drawing. For the sake of clearness the parts $d$ and $e$ of the optical system are represented by their principal planes $H_d$ and $H_e$ and it is assumed that, while the ray transmitter $c$ is moving, the selenium cell and the optical system $d$, $e$ are motionless. Considering a ray pencil E emanating from a point $f$ on the transmitter $c$, it will be seen that, when the transmitter $c$ is in the position indicated by full lines, the lens $d$ images the point $f$ at a point $f^1$ at the place of the system $e$. As can be deduced from the path of the ray pencil F, the aperture of the lens $d$ is imaged on the selenium cell $a$. If the ray transmitter $c$ is moved into the position indicated by dash lines, the point $f$ is imaged at $f^2$, as can be deduced from the path of the pencil B. The image of the point $f$ now travels at the place of the lenses $e$, that is to say at a place where this travelling is harmless. The pencil F remains in its position and illuminates the selenium cell always in the same manner, regardless of the position of the ray transmitter $c$.

If, like in this case, the device moves always in one and the same direction only, the lenses of the part *e* can take the form of strips, that is to say the diameter perpendicular to the moving direction may be shorter than that parallel to the same.

I claim:

A ray receiver to be influenced by a pencil of light rays emanating from a ray transformer, the receiver and transmitter moving relatively to each other in directions transverse to that of the ray pencil, the said ray receiver having an electrical cell sensitive to light and an optical system rigidly connected to the said cell, the optical system consisting of two parts, the foremost of these two parts including means to produce on the hindmost part of the optical system an image of the ray transmitter when the ray transmitter is anywhere within a space extending a substantial distance to either side of the axis of the said optical system, the said electrical cell being located behind the said hindmost part, the said hindmost part including means to produce an image of the foremost part over substantially the entire area of the said electrical cell.

FRANZ SCHARFF.